Oct. 23, 1962  E. C. LUNDEBERG  3,059,811
FEEDER FOR HOOK STAY SETTING MACHINE
Original Filed Aug. 31, 1956  11 Sheets-Sheet 3

INVENTOR.
Edgar C. Lundeberg
BY
Ooms, McDougall, Williams & Hersh
Attorneys

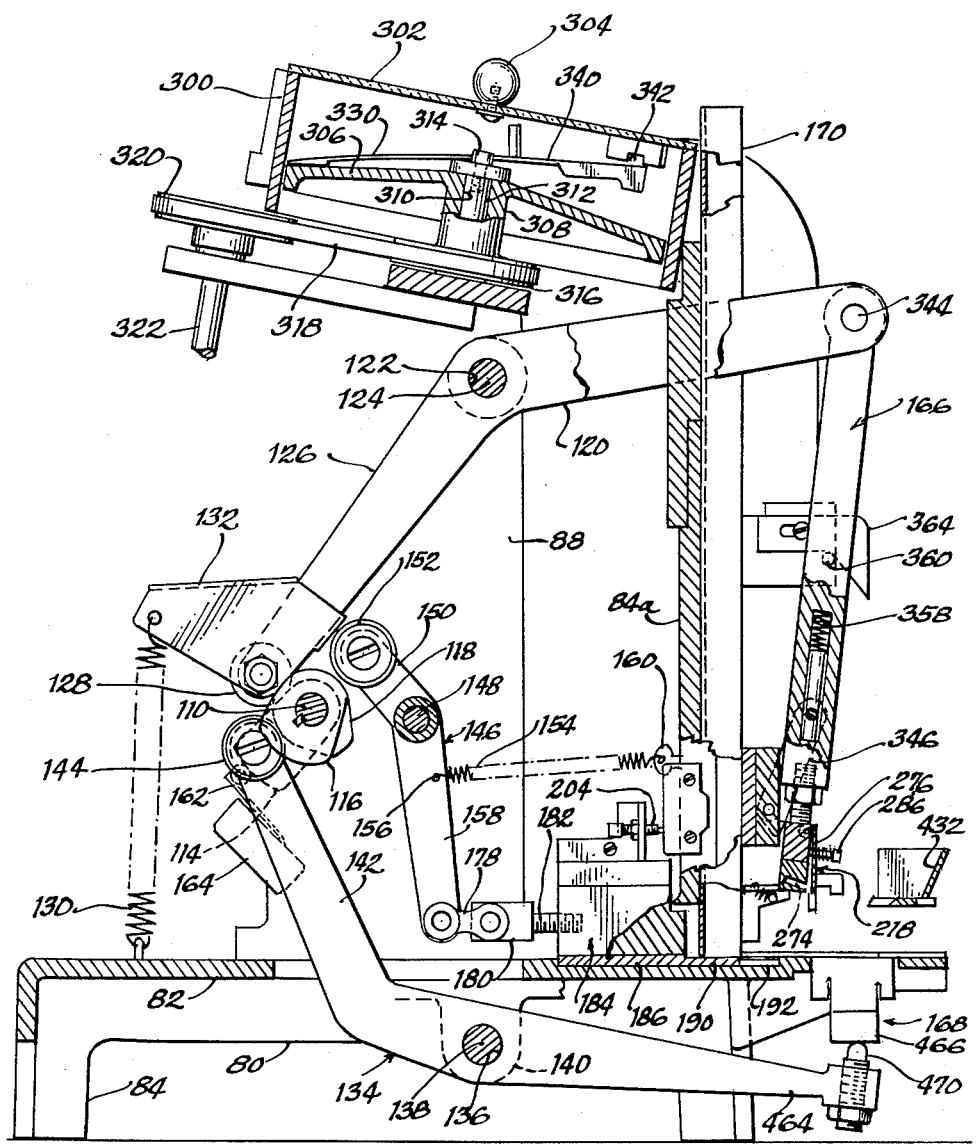

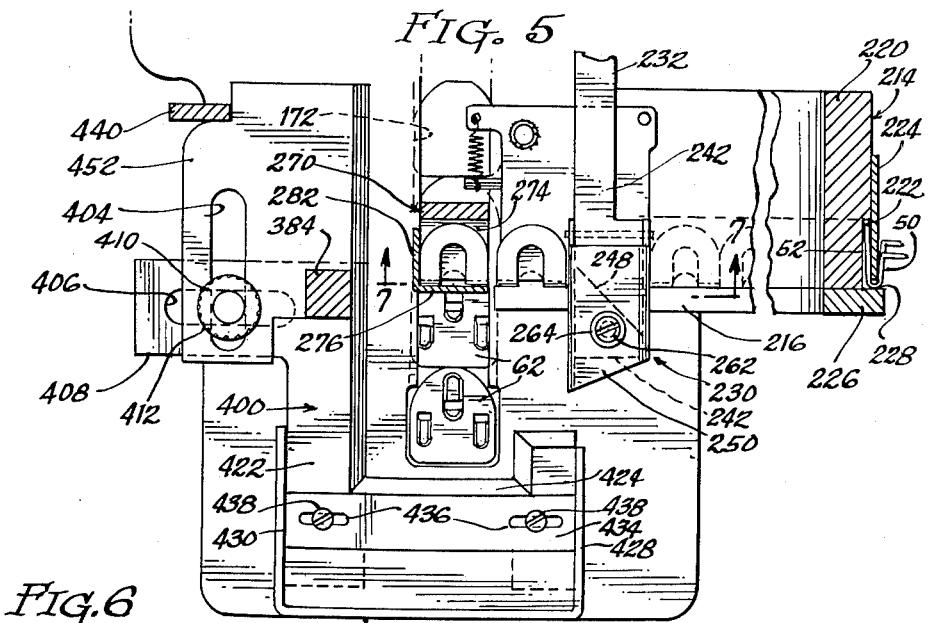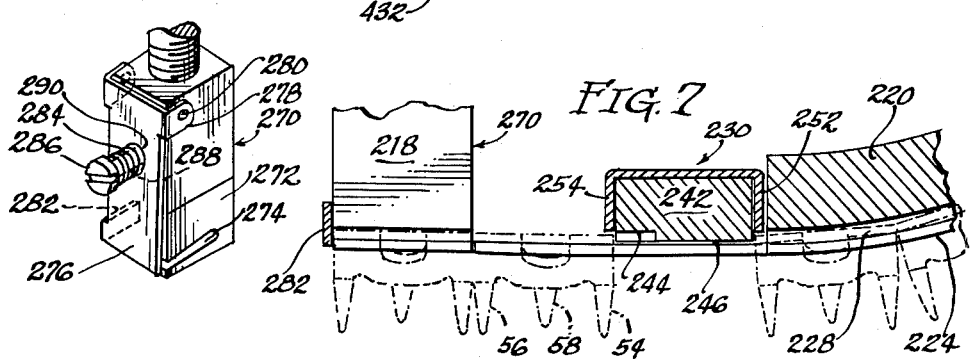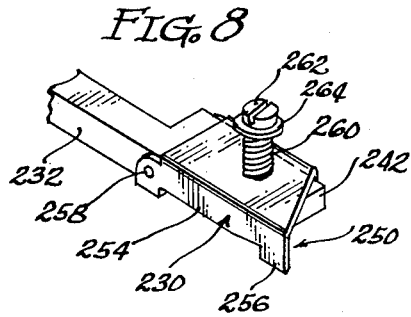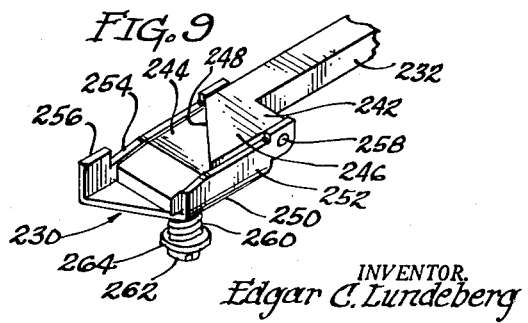
INVENTOR.
Edgar C. Lundeberg
BY
Ooms, McDougall, Williams & Hersh
Attorneys

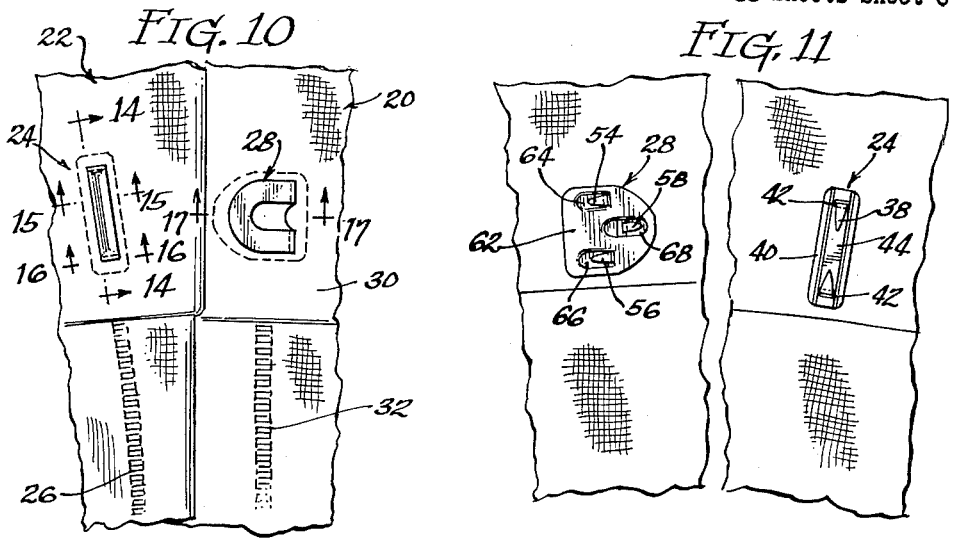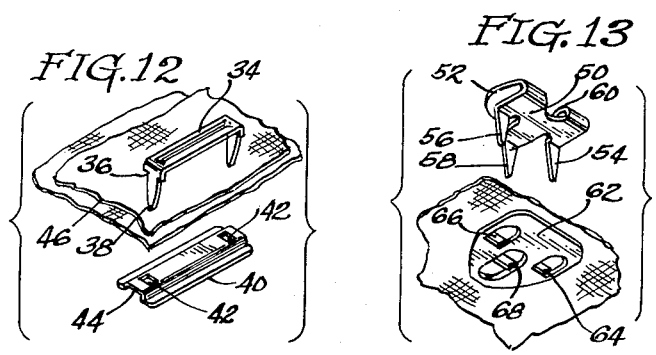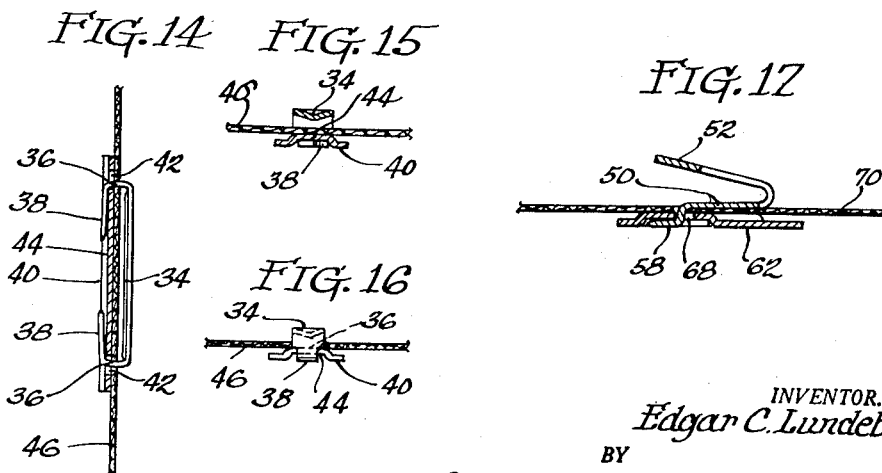

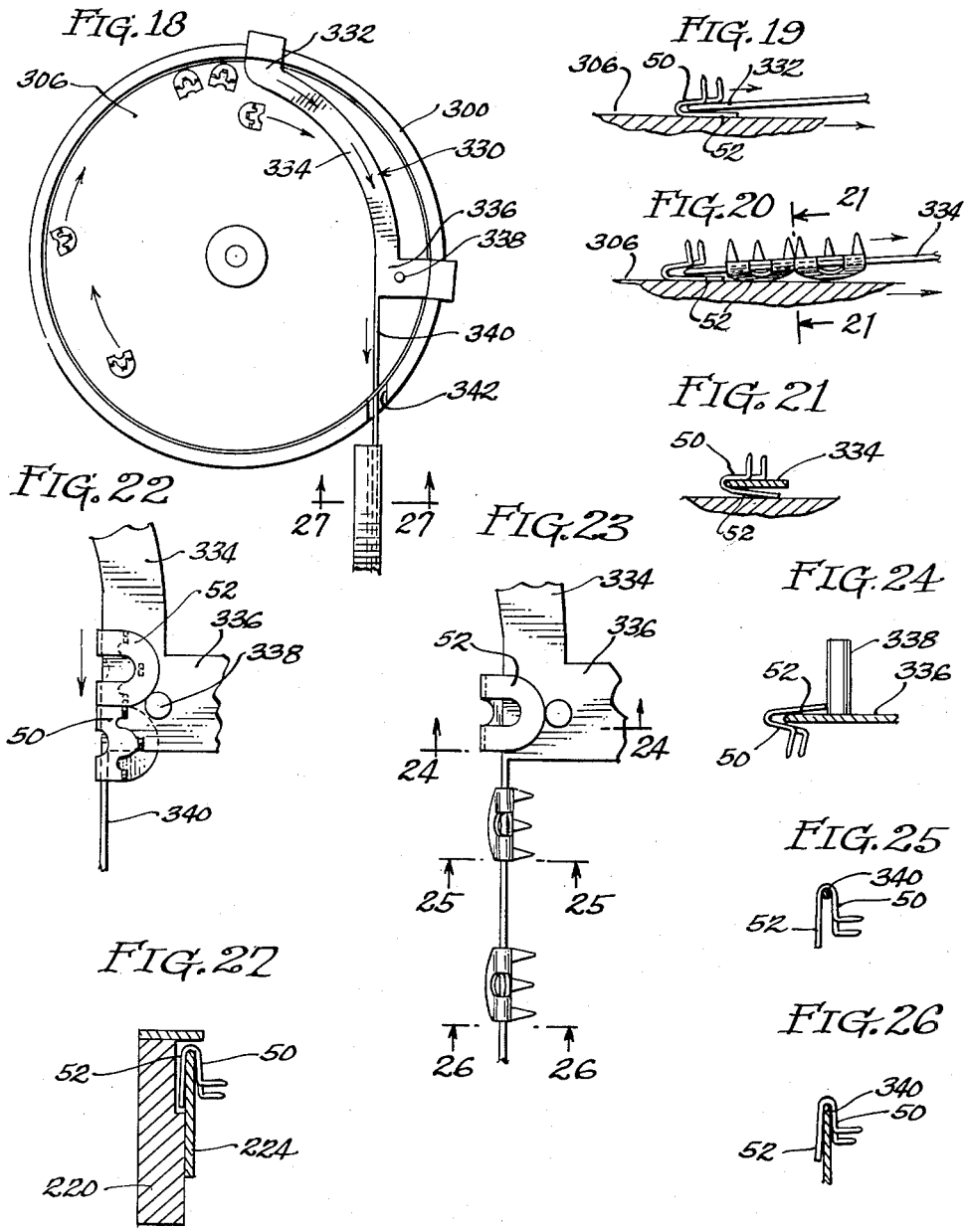

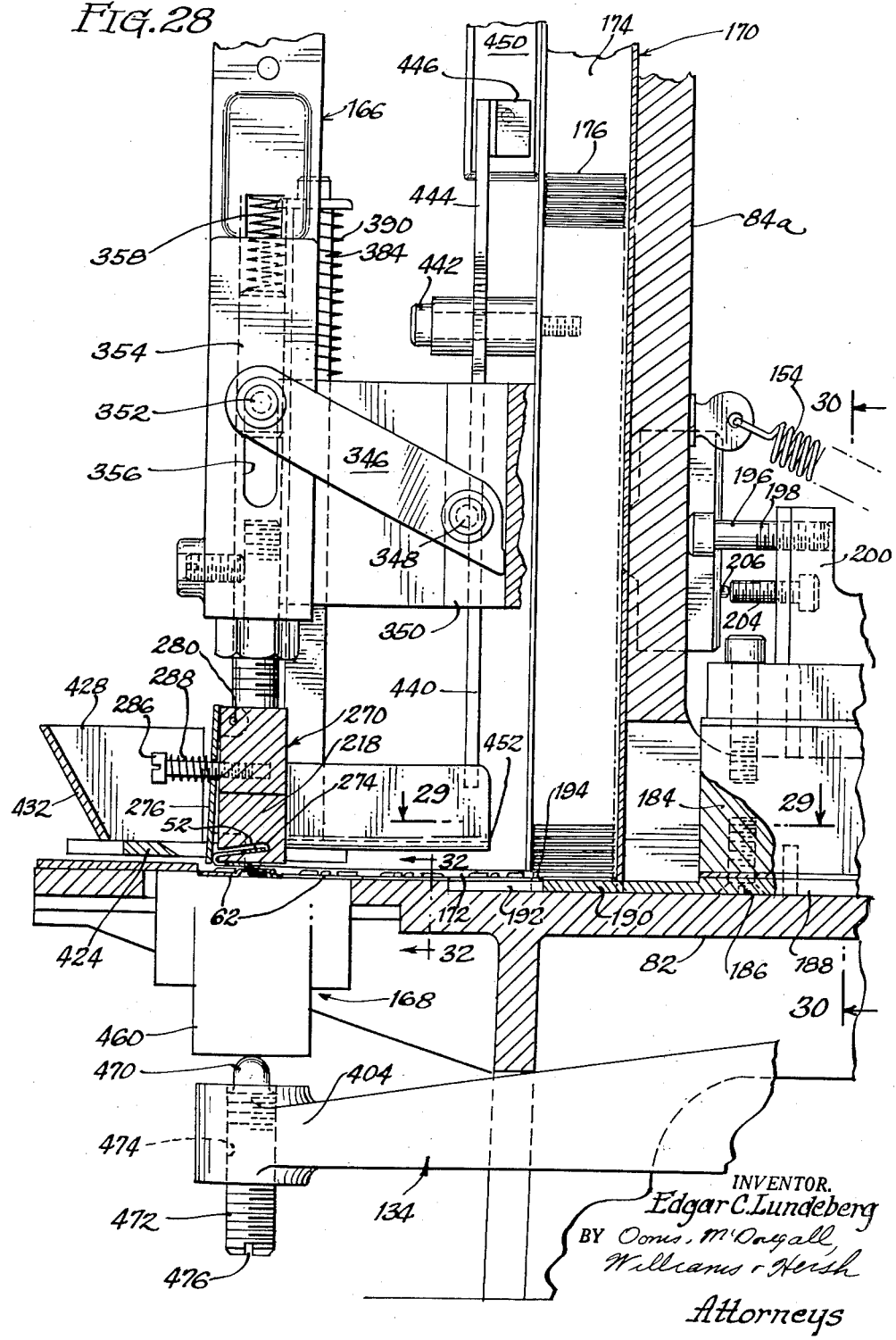

Oct. 23, 1962  E. C. LUNDEBERG  3,059,811
FEEDER FOR HOOK STAY SETTING MACHINE
Original Filed Aug. 31, 1956  11 Sheets-Sheet 9
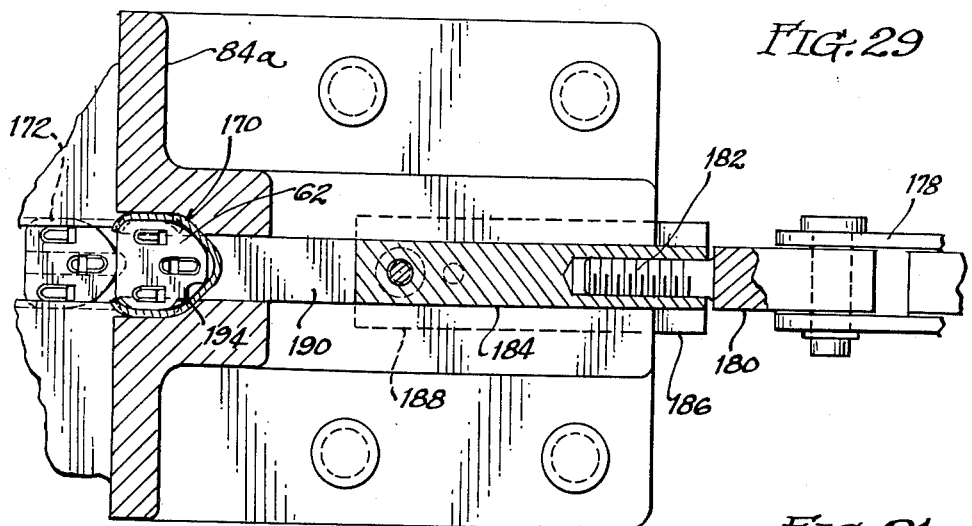
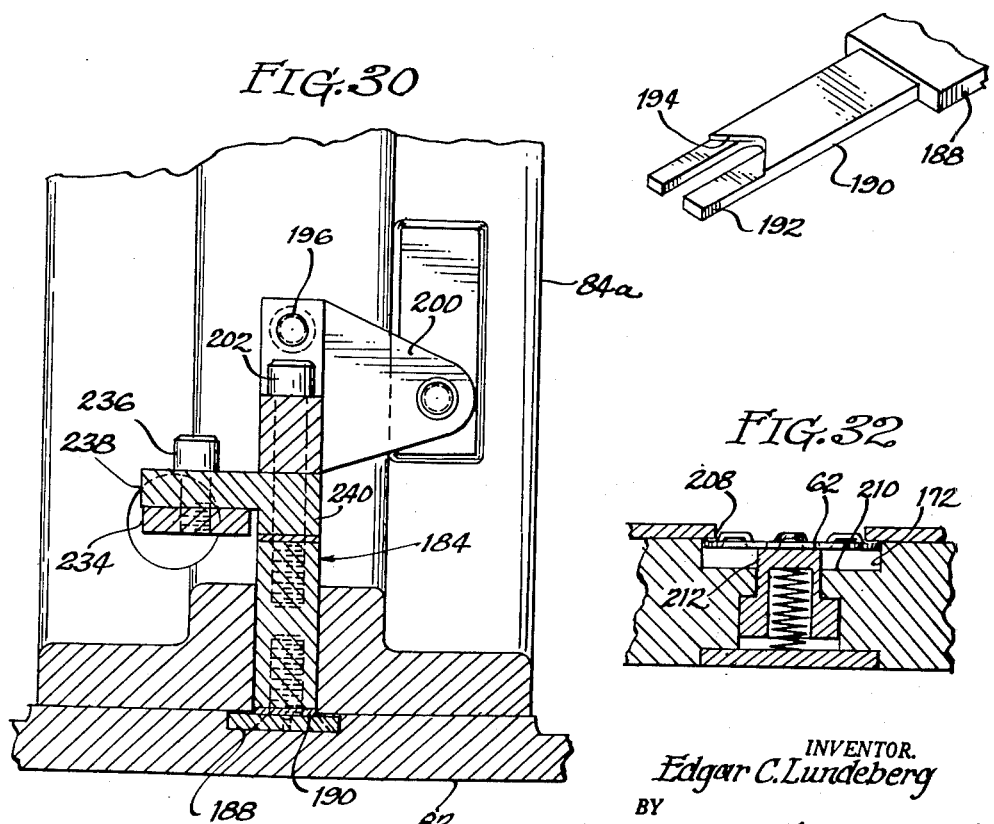
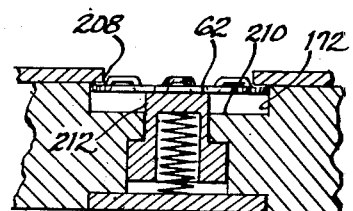
INVENTOR.
Edgar C. Lundeberg
BY
Ooms, McDougall, Williams & Hersh
Attorneys Oct. 23, 1962 E. C. LUNDEBERG 3,059,811
FEEDER FOR HOOK STAY SETTING MACHINE
Original Filed Aug. 31, 1956 11 Sheets-Sheet 10
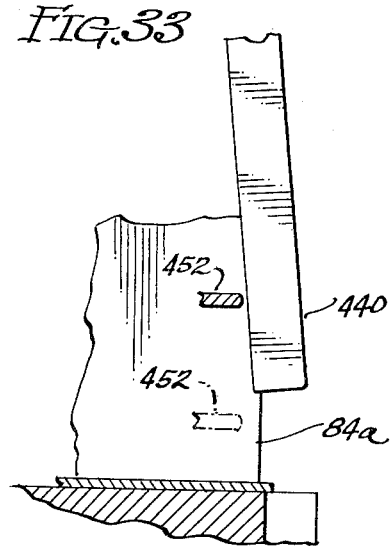
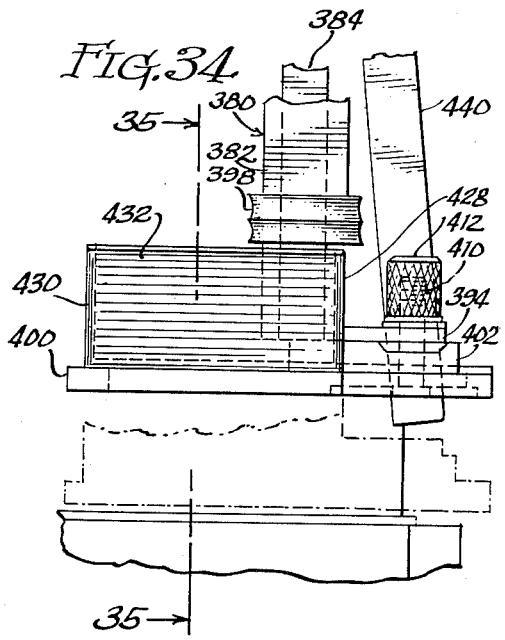
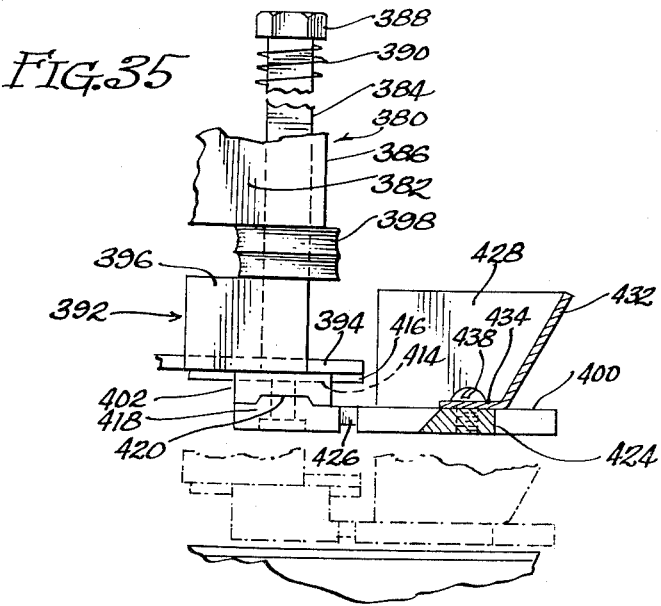
INVENTOR.
Edgar C. Lundeberg
BY
Ooms, McDougall, Williams & Hersh
Attorneys Oct. 23, 1962 E. C. LUNDEBERG 3,059,811
FEEDER FOR HOOK STAY SETTING MACHINE
Original Filed Aug. 31, 1956 11 Sheets-Sheet 11

INVENTOR.
Edgar C. Lundeberg
BY
Ooms, McDougall, Williams · Hersh
Attorneys

United States Patent Office 3,059,811
Patented Oct. 23, 1962

3,059,811
FEEDER FOR HOOK STAY SETTING MACHINE
Edgar C. Lundeberg, Hartford, Conn., assignor, by mesne assignments, to The North & Judd Manufacturing Co., a corporation of Connecticut
Original application Aug. 31, 1956, Ser. No. 608,418, now Patent No. 2,936,454, dated May 17, 1960. Divided and this application Mar. 7, 1960, Ser. No. 13,123.
3 Claims. (Cl. 221—167)

This invention relates to a hook and stay plate assembly machine for attachment as fastening means to a garment or the like textile material, and it relates more particularly to a machine of the type described which operates substantially automatically through a sequence of operations to effect attachment of hook and stay plate members in position of use on a garment and separately to advance a hook member and a stay plate member into positions of use for a subsequent cycle of operation.

This is a division of application Serial No. 608,418, filed August 31, 1956, now Patent No. 2,936,454 entitled "Hook-Stay Setting Machine."

It is an object of this invention to produce a machine of the type described which operates automatically to attach a hook member and a stay plate member in proper position of use on a garment; which embodies means for feeding hook members into position to supply the machine with a plurality of such elements in position of use by the machine; which guards against operation of the machine through a cycle until all elements are properly returned to a normal position and all obstructions have been cleared from the moving elements of the machine; which embodies means for separately advancing hook members and stay plate members into position for attachment one with the other in a garment or textile material thereby to effect a controlled assembled relation between the hook and the garment for use as a fastening means with an eye member separately applied by a machine described and claimed in my copending application Serial No. 587,784, filed May 28, 1956, now Patent No. 2,939,-145, and entitled "Eye Setting Machine"; which embodies means properly to align the garment for receiving the hook member and stay plate member in positions for attachment; which embodies means for effecting a sequence of operations to advance the hook member and stay plate member in feeding relation and for interengagement of the hook member and stay plate member followed by bending of the prongs of the hook member to effect attachment of the elements in position of use on a garment; which embodies means to protect the operator against injury by the machine by preventing operation of the machine until the elements are properly positioned for use and until the operator is clear of all moving parts; which embodies means for adjustment of the parts of the machine in a simple and efficient manner to vary the stroke and the sequence of operations of the machine; which embodies means for guiding the elements in movement properly to align the parts and elements that are operated thereby; which prevents operation of the machine whenever any of the elements are out of proper position as when any of the parts are in other than in home position; which embodies means resiliently urging the various elements of the machine towards home position thereby to prevent breakage of parts when obstructions are encountered; and which operates in a safe and efficient manner, which is sturdy in construction and simple in operation, thereby to permit use of the machine at high speed by unskilled labor for fixing hook and eye members as fastening means in the tailoring trade.

These and other objects and advantages of this invention will hereinafter appear and for purposes of illustration, but not of limitation, an embodiment of the invention is shown in the accompanying drawings, in which—

FIG. 4 is a sectional elevational view taken longitudinally through about the center of the machine shown in FIG. 1;

FIG. 5 is a sectional view taken along the line 5—5 of FIG. 1;

FIG. 6 is a perspective elevational view of the holder for the hook members on the ram;

FIG. 7 is a sectional view taken along the line 7—7 of FIG. 5;

FIG. 8 is a perspective elevational view of the hook-advancing means shown in FIG. 5 of the drawing;

FIG. 9 is a perspective view of the hook-advancing means of FIG. 8, taken from the bottom side;

FIG. 10 is a perspective elevational view showing a hook and eye assembly in position of use as a fastening means in the fly of a man's trousers;

FIG. 11 is a sectional view of the elements shown in FIG. 10, taken from the back side, with portions cut away to show the attachment means for securing the hook and eye members to the respective stay plates with the textile material of the garment therebetween;

FIG. 12 is a perspective view of the eye and stay plate member in relative positions of use for assembly in attachment with a textile material therebetween;

FIG. 13 is a perspective view of the hook and stay plate members in relative position for attachment with a textile material therebetween;

FIG. 14 is a sectional view taken along the line 14—14 of FIG. 10;

FIG. 15 is a sectional view taken along the line 15—15 of FIG. 10;

FIG. 16 is a sectional view taken along the line 16—16 of FIG. 10;

FIG. 17 is a sectional view taken along the line 17—17 of FIG. 10;

FIG. 18 is a top plan view of a hook feed means embodying features of this invention for supplying hook members in position for feeding to the machine;

FIG. 19 is a fragmentary sectional view showing a beginning portion of the ramp on which the hook members are received in feeding relation;

FIG. 20 is a view similar to that of FIG. 19 showing a plurality of hook members in position for advancement on the ramp;

FIG. 21 is a sectional view taken along the line 21—21 of FIG. 20;

FIG. 22 is a fragmentary view of an upper portion of the ramp showing means for rejection of hook members other than those in proper position for feeding;

FIG. 23 is a view similar to that of FIG. 22 showing the position of acceptable hook members;

FIG. 24 is a sectional view taken along the line 24—24 of FIG. 23;

FIG. 25 is a sectional view taken along the line 25—25 of FIG. 23;

FIG. 26 is a sectional view taken along the line 26—26 of FIG. 23;

FIG. 27 is a sectional view taken along the line 27—27 of FIG. 18;

FIG. 28 is a sectional elevational view of the head end of the machine;

FIG. 29 is a sectional view taken along the line 29—29 of FIG. 28;

FIG. 30 is a sectional view taken along the line 30—30 of FIG. 28;

FIG. 31 is a perspective view of a portion of the stay plate feed means;

FIG. 33 is a sectional elevational view of a portion of the machine showing the operating lever;

FIG. 34 is a side elevational view of a portion of the machine showing the guide and protective means in a raised position;

FIG. 35 is a sectional view of a portion of the device shown in FIG. 34;

FIG. 37 is a side elevational view of a fragmentary portion of the device showing the outer guide means for the ram.

Figure 1:
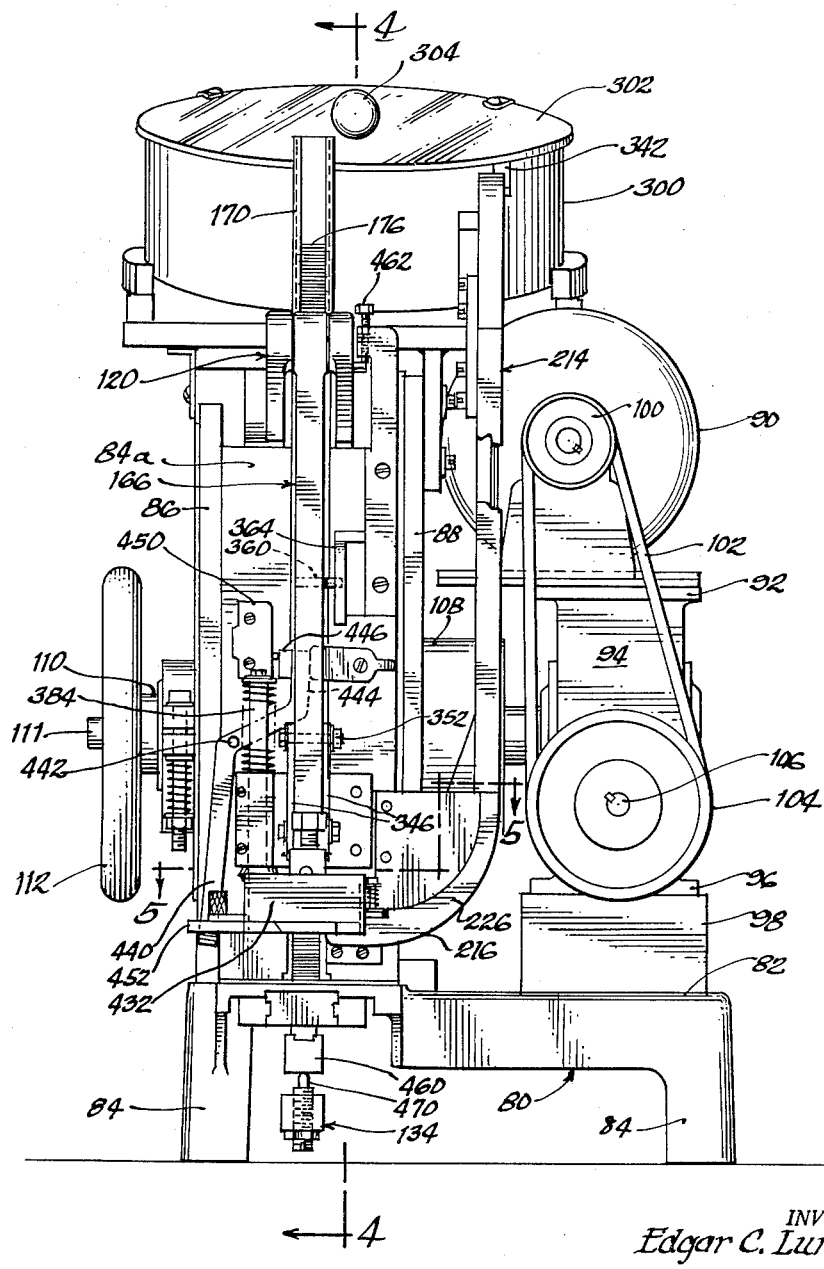
FIG. 1 is a front elevational view of the machine embodying the features of this invention with the enclosing housing removed to expose the operating elements.

To the present, the garment trade has made use of various types of fastening means for securing one part of a garment to another. More recently, many of these fastening means have been replaced by hook and eye fasteners because of the more positive interconnection that can be made and because such hook and eye fasteners can now be fixed in position of use in a simple and efficient manner capable of being adapted to high-speed production without causing tearing or other deterioration of the garment in assembly or in use.

Application of the hook and eye fastener, as described herein, will be made with respect to its use by the garment trade as a primary fastening means for joining the waistband 20 of a trouser 22 to close the fly of the trouser prior to the operation of the zipper or the like secondary fastening means (FIGURE 10). In such application, the eye assembly 24 is secured to one end of the waistband 20 in substantially vertical alignment with the zipper section 26, while the hook assembly 28 is secured to the other end portion of the waistband 20 in crosswise alignment with the eye assembly and in substantially vertical alignment with the other zipper section 32.

The eye assembly, as represented in FIGS. 10–16, comprises an eye member in the form of an elongate metal member having a body portion 34 with the ends turned outwardly substantially perpendicularly from the bottom portion to provide a shoulder 36 spaced a short distance outwardly from the body portion and with the end portions 38 extending outwardly from the shoulder being in the form of prongs for piercing the textile material of the garment and for attachment to the underlying base plate for support.

The base plate 40, formed also of a metal stamping or the like rigid material, is dimensioned to have a length slightly greater than that of the body portion of the eye member with openings 42 aligned with the prongs 38 for insertion of the prongs therethrough. The space between the openings 42 is offset inwardly from the back wall to provide a recess 44 which receives the portions of the prongs that extend through the openings 42 and are bent laterally substantially perpendicularly into the recess to effect the assembled relation.

In assembly, the eye member 34 is positioned with the ends of the prongs 38 aligned with the openings 42 in the stay plate and with the textile material 46 in between. The eye member is advanced to project the prongs through the textile material and into and through the openings of the stay plate until the shoulders 36 come into contact with the portions of the stay plate adjacent the openings resiliently to engage portions of the textile material therebetween while the intermediate portions of the eye member—that is, the body portion 34—is spaced a short distance beyond the textile material substantially throughout its length to provide a slotted opening dimensioned to receive the tongue of the hook member therebetween. The portions of the prongs extending through the openings of the stay plate are bent inwardly to lie substantially entirely within the recess 44 adjacent the back side of the stay plate. Thus, the eye member is fixed in position of use with substantial portions of the textile material in resilient engagement to prevent tearing and the like.

In my copending application Serial No. 587,784, filed May 28, 1956, now Patent No. 2,939,145, description is made of a machine which operates automatically to assemble eye and stay plate members in position of use in a textile material. The machine forming the subject matter of this application is intended to be used alongside the eye and stay plate assembly machine for automatic operation to assemble hook and stay plate members in position in a textile material for use in combination with the eye assembly to effect a fastening means. While construction and operation of the machine will be described with reference to use with a specific hook and stay plate to effect the assembled relation in a proper position in the textile material, it will be understood that the machine can be employed with equivalent efficiencies with hook and stay plate members of modified constructions and the invention, as a result, is not limited herein to use of the machine with any particular hook and stay plate structure.

In the illustrated modification, the hook member is in the form of a sheet metal part having a horizontally disposed body portion 50 with a tongue 52 extending angularly upwardly from the rearward edge of the body portion in a closely spaced relation therewith to provide the hook section. The body portion has prongs 54, 56 and 58 struck to extend perpendicularly downwardly from separated sections of the body portion, preferably with a pair 54 and 56 in laterally spaced-apart relation extending downwardly from the rearward portion adjacent the opposite side edges, while a third prong 58 extends downwardly from a portion spaced forwardly of the pair and centrally thereof to provide a three-point support which holds the hook in proper alignment in the textile material and in operative engagement with the stay plate. The hook portion or tongue 52 can have a central portion cut out as at 60, for various reasons, but such cutout is not essential to the construction or operation of the fastener.

The stay plate, used in combination with the hook member, comprises a relatively flat strip 62 of sheet material cut to about triangular shape to provide a body portion of greater dimension than the body portion of the hook member. The body portion 62 is formed with openings 64, 66, and 68 in spaced-apart relation corresponding to that of the prongs extending downwardly from the body portion of the hook member to enable the prongs to be inserted from the top side downwardly through the openings as the body portions 50 and 62 are brought together into closely spaced-apart parallel relation for assembly with the textile material 70 therebetween, as illustrated in FIG. 17. The portions adjacent the openings 64, 66, and 68 may be offset upwardly in the body portion to provide recesses adapted to receive the end portions of the prongs extending through the openings and bent upwardly substantially perpendicularly to lie substantially parallel adjacent the under side of the stay plate. It is preferred to bend the prongs of the rearward pair rearwardly in the opposite direction of the forward prong 58 to prevent relative endwise movement between the members but the prongs may, if desirable, be bent in the same direction. Thus, the recess adjacent the forward prong is adapted to extend both forwardly and rearwardly of the opening 68.

The setting machine comprises a stationary frame 80 of rigid construction formed of a horizontally disposed base plate 82 supported on legs 84. Extending vertically upwardly from the top side of the base plate is a crosswise extending front frame plate 84a and extending rearwardly from the front frame plate are a pair of laterally spaced-apart side frame plates 86 and 88.

Figure 2:
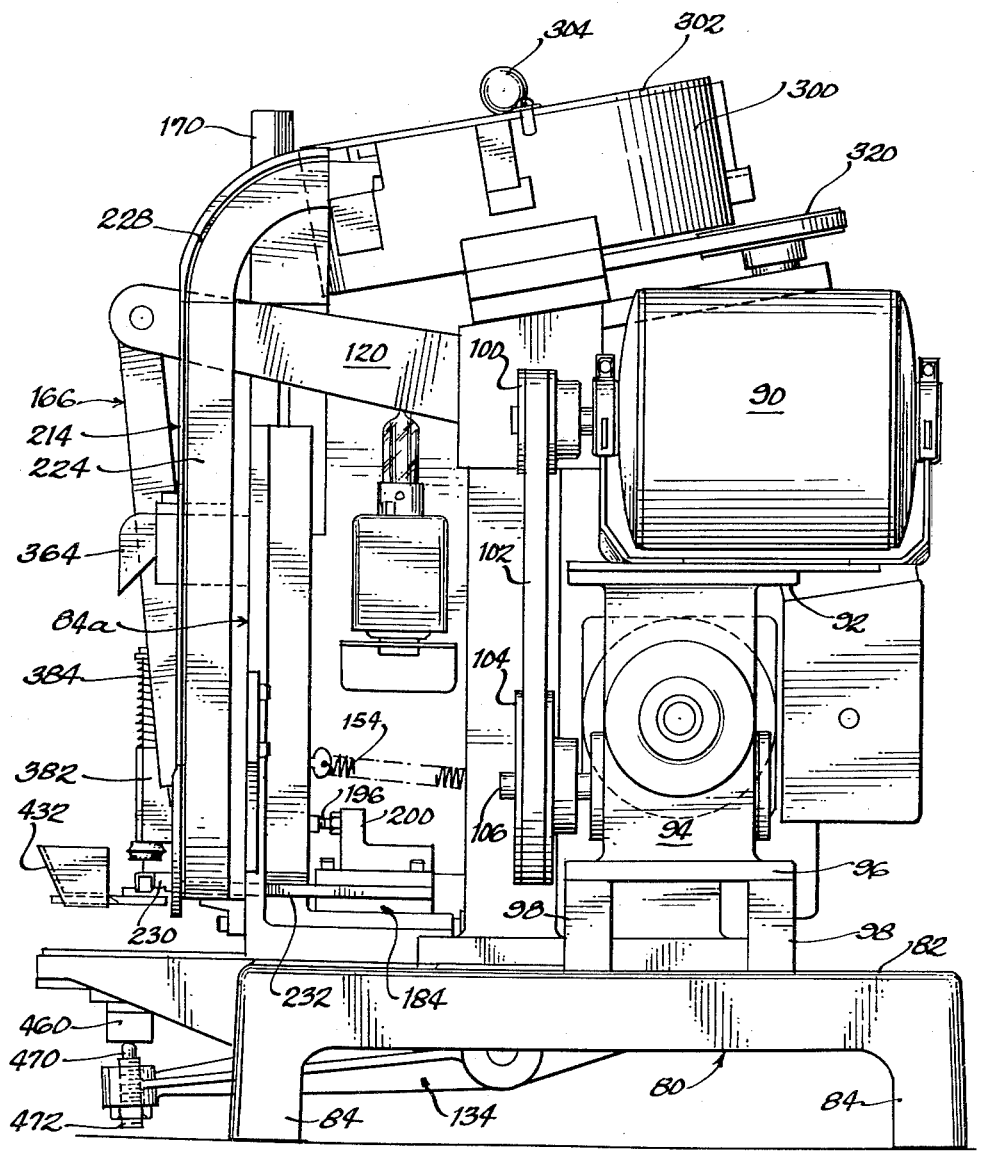
FIG. 2 is an elevational view of the machine shown in FIG. 1 with a view from the right side of the machine.
Figure 3:
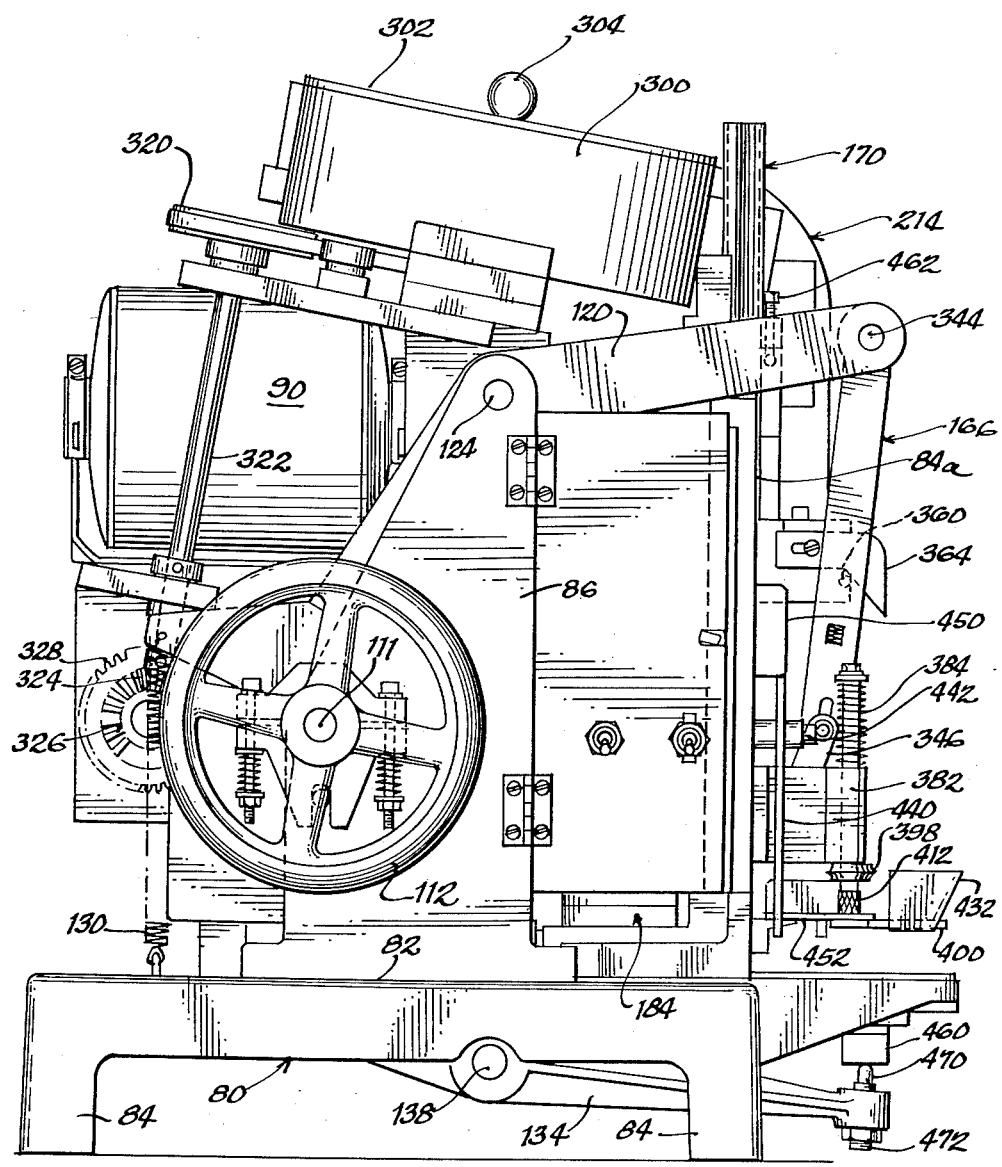
FIG. 3 is an elevational view similar to that of FIG. 2 but with a view from the left side of the machine.
Figure 36:
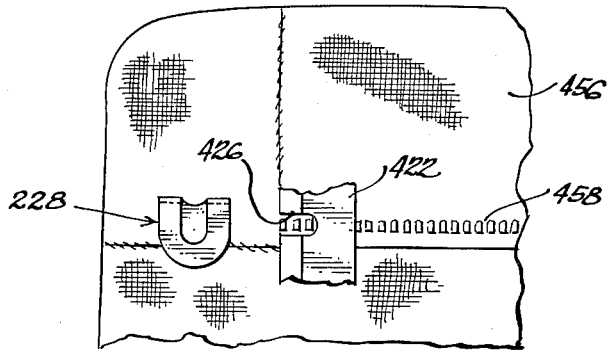
FIG. 36 is a top plan view showing the arrangement of parts between the guide means and the textile material positioned for receiving the fastener.

The machine is adapted to be driven by a power means in the form of an electrical motor 90 supported in spaced relation above the base plate 82 by means of a platform 92 fixed to the top side of a conventional reduction gear box 94. The reduction gear box 94 is, in turn, fixed to a platform 96 having legs 98 extending downwardly into engagement for support on the base plate 82. A pulley 100 on the drive shaft of the electrical motor 90 is operatively connected by means of an endless belt 102 to a pulley 104 fixed to the end of the driven shaft 106 of the gear train located within the gear box (FIGURES 1 and 2).

A magnetic clutch 108 of conventional design operates to transmit rotational movement of the drive shaft to rotational movement of a horizontally disposed shaft 110 mounted for rotational movement in bearings supported in the frame plates 86 and 88. The shaft 110, which is journalled in the bearings on the frame plates, has a portion 111 extending laterally beyond the frame plate for receiving a flywheel 112 on the end thereof. Fixed to the drive shaft 110, between the frame plates 86 and 88 for rotational movement therewith, are a series of cams, hereinafter referred to as the ram-operating cam 114, the bending cam 116, and the feed cam 118.

A bell crank lever 120, hereinafter referred to as the ram lever, is formed with an opening 122 at its elbow intermediate the ends through which a horizontally disposed supporting shaft 124 extends between the upper end portions of the side frame plate 86 and 88 for enabling free rocking movement of the bell crank lever 120 about the shaft as a pivot (FIGURE 4). The arm 126 extending rearwardly from the pivot 124 has a follower 128 on the end thereof in vertical alignment with the ram-operating cam 114. The ram lever 120 is constantly urged to rock about its pivot in the direction to bring the follower 128 into resilient engagement with the edge of the cam 114, as by means of a tension spring 130 fixed at its lower end to the base plate 82 or a part of the side frame members while the upper end portion of the tension spring 130 is anchored onto a bracket plate 132 secured to extend rearwardly from the end portion of the arm 126. The bell crank lever is thus constantly urged to rock in the counterclockwise direction about its pivot to bring the follower into contacting relation with the cam for guiding the lever in rocking movement about its pivot.

Another bell crank lever, hereinafter referred to as the anvil lever 134, has an opening 136 intermediate its ends for receiving a horizontally disposed shaft 138 journalled at its ends to laterally spaced-apart ears 140 depending from the under side of the base plate 82 to permit free rocking movement of the anvil lever 134 in a vertical plane about the shaft 138 as a pivot. The arm portion 142, which extends rearwardly and upwardly from the pivot, is provided with a follower 144 on the end thereof in vertical alignment with the bending cam 116. The follower is urged into resilient engagement with the periphery of the cam by gravitational force responsive to the excess developed by the excess of weight in the lever forwardly of the pivot 138. Instead, more positive means, such as spring means, may be employed constantly to urge the lever 134 to rock in the clockwise direction about its pivot to bring the follower 144 into guiding relation with the peripheral edge of the bending cam 116.

A still third bell crank lever, hereinafter referred to as the feed lever 146, is mounted for rocking movement about a shaft 148 extending horizontally laterally between the side frame plates 86 and 88 but spaced downwardly from the shaft 124. The arm portion 150 which extends rearwardly and upwardly from the pivot 148 is provided with a follower 152 on the end thereof which is in vertical alignment and in position to engage the periphery of the feed cam 118. The feed lever is constantly urged to rock about its pivot in the counterclockwise direction to bring the follower 152 into resilient engagement with the edge of the cam 118 by means of a tension spring 154 secured at its rearward end onto a stud 156 extending laterally from the forwardly and downwardly extending arm portion 158 of the feed lever, while the other end of the spring is secured to a bracket 160 extending rearwardly from the back side of the front frame plate 84a.

Mounted on the frame plate in position to be engaged by the cam 114 is the contact arm 162 of a switch 164 which controls the operation of the magnetic clutch to effect engagement of the clutch when the starting switch, hereinafter described, is closed and to disengage the clutch to stop rotational movement of the drive shaft 108 when the switch is closed by the cam 114 upon completion of a cycle of operation of the machine, thereby to stop the cams while permitting the motor 90 to continue to operate.

To the present, description has been made of the main drive mechanism and takeoff therefrom by cam-operated levers to effect actuation of a ram 166, an anvil mechanism 168, and for operation of the feed mechanism which will hereinafter be described for advancing the hook and stay plate members in position to be acted upon by the ram and anvil for assembly. Description will hereinafter be made of the mechanism for conversion of such movements of the described operating levers to effect a sequence of operations for interconnecting a hook member with a stay plate having the textile material in between and for advancing a hook and stay plate member in position for use in the next cycle of operations.

Referring now to the stay plate feed mechanism, the numeral 170 represents an elongate vertically disposed magazine releasably secured to the front face of the front frame plate 84a in vertical alignment with the rearward end portion of a feed slot 172 which extends forwardly from the front frame plate to the anvil. The magazine is formed with a bore 174 extending through the length thereof dimensioned to correspond with the stay plates slidably to receive the stay plates in stacked relation one over the other, as illustrated in FIG. 28 of the drawings.

The stay plate feed mechanism operates to displace the lowermost of the stay plates in the stack 176 from the magazine into the slot 172 extending forwardly from the magazine to the anvil. Displacement is effected in response to rocking movement of the feed lever 146 under control of the feed cam 118. For this purpose, the forward end portion of the forwardly extending arm 158 of the feed lever is connected by a toggle link 178 to the rearward end portion of a bracket 180 which has a threaded shaft 182 extending forwardly into threaded engagement with the rearward end portion of a slide block 184 to transmit rocking movement of the feed lever to linear reciprocal movement of the slide block 184. The stroke of the block can be adjusted by turning movement of the toggle link 178 and the slide block 184.

Secured, as by means of a setscrew 186, to the under side of the slide block and in the forward end portion thereof, is an elongate ejector plate 188 which is received for endwise sliding movement in an elongate recess provided in the base plate 82 and extending rearwardly as a continuation of the groove 172 for a distance equivalent to the length of the ejector plate 188 plus the stroke thereof between its normal feed position and retracted position (FIGURE 28). Forming a part of the ejector plate is an ejector arm 190 which has a bifurcated forward end portion 192 which is stepped down from the remainder of the arm by an amount corresponding to the thickness of a single stay plate (FIGURE 31). In its retracted or rearwardly displaced position, the stepped-down portion 192 of the ejector arm 190 is in position to form the bottom support of the stack of stay plates in the housing to position the lowermost stay plate in advance of the shoulder 194 formed with the remainder of the arm.

As the arm 190 is displaced forwardly from its retracted position to its normal feed position, the shoulder portion passes forwardly through the magazine to displace the lowermost stay plate from the magazine into the feed groove 172 extending forwardly as a continuation of the recess. When in normal feed position, the thicker portion of the ejector arm 190 rearwardly of the stepped-down portion extends through the slot beneath the magazine to support the stack of stay plates therein. As the shoulder 194 clears the housing upon retraction of the ejector arm from normal feed position to retracted position, the stack of stay plates in the magazine drops down onto the stepped-down bifurcated portion 192 of the arm to again position the lowermost stay plate in advance of the shoulder for ejection in a subsequent cycle of operation.

Forward displacement of the slide block 184 to normal position is determined by a stop bolt 196 having a threaded end portion 198 received in threaded engagement in a threaded opening extending rearwardly from the front wall of a bracket 200 secured as by means of a bolt member 202 to the slide block 184, FIG. 30. The head of the bolt 196 is in alignment to engage the rear wall of the front frame plate 84a in stop position. The latter can be determined by turning movement of the bolt 196 for adjustment of the head in the direction toward and away from the frame plate. Also secured to the slide block 184 is a switch-operating bolt 204 in alignment with a switch button 206 for engagement when in normal position to close the switch, thereby to enable subsequent operations of the machine (FIGURE 4). When an obstruction is encountered which prevents return of the slide block 184 to normal position responsive to the resilient force of the spring 154, the switch button 206 is not engaged to close the switch and the machine is automatically stopped from further operation.

Figure 32:
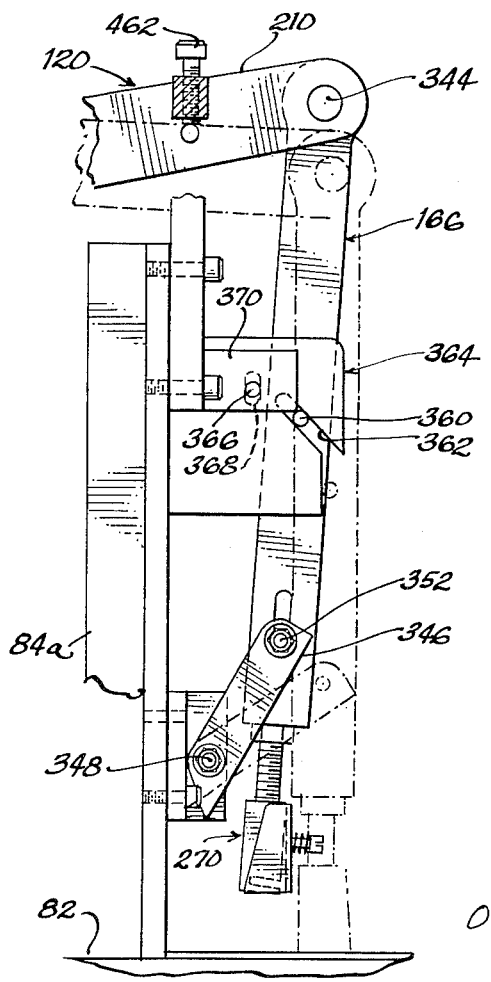
FIG. 32 is a sectional view taken along the line 32—32 of FIG. 28.

The feed slot 172 extending forwardly from the magazine to the anvil is dimensioned to have a width corresponding to the width of the stay plates. The groove is formed with the upper edge portion of the base plate extending laterally as an overhang 208, FIG. 32, which extends inwardly beyond the edge portions of the stay plate to prevent vertical displacement of the stay plates from the slot. The bottom wall 210 of the feed slot is formed with a central portion 212 separated from the remainder and means are provided constantly to urge the central portion upwardly against the under side of the stay plate resiliently to hold the stay plates within the slot against the under side of the overhangs 208 to maintain constant control.

As the stay plate which is lowermost in the stack is displaced forwardly from the magazine into the feed slot 172, it engages the rearmost of the stay plates aligned in end-to-end relation in the slot, thereby to effect forward movement of the entire group by an amount to position the stay plate at the forward end in position of use on the anvil.

The hook members are advanced concurrently with the stay plates in feeding relation to the ram 166 responsive to forward displacement of the slide block 184 from retracted to normal feed position. As illustrated in FIGS. 1, 2, and 5–9, the hook members are fed downwardly through a feed chute 214 which is vertically disposed substantially throughout its length with a lower portion 216 curved laterally inwardly to extend substantially horizontally in the direction towards the ram head 218.

The feed chute 214, as shown in FIG. 5, comprises a vertically disposed plate 220 having a groove 222 in the lateral edge portion thereof dimensioned to have a width slightly greater than the length of the tongue 52 and a thickness slightly greater than the thickness of the tongue. A strip 224 of relatively rigid material is secured to the front face of the plate 220 and another metallic plate 226 is secured to the side of the plate 220 with the strip 224 having a lateral edge portion overlapping the groove and with the plate 226 extending beyond the edge of the overlapping end portion of the strip and with a spaced relation therebetween to define an opening 228 through which the bent portion interconnecting the tongue 52 with the body portion 50 extends. Thus, the tongue 52 is confined within the opening 222 defined between the plate 220, the strip 224, and the plate 226 to permit vertical sliding movement of the hook member with the body portion extending outwardly thereof through the opening 228 with the prongs extending outwardly from the bottom side of the body portion.

Thus, the hook members are able to fall gravitationally through the slot of the feed chute for alignment in end-to-end relation and with sufficient force to cause lateral displacement of the hook members in alignment in the horizontally disposed end portion 216 of the feed section. It will be apparent that the hook members are incapable of inadvertent displacement from the feed chute since the strip 224 confronts the forward edge to confine the hook members in the slot while the side plates 226 militate against outward displacement and together they provide the runway surfaces over which the hook members slide in the horizontally disposed portion of the feed section. The plate 220 terminates in the horizontally disposed portion at a point spaced laterally from the ram head 218 by an amount corresponding to the width of about two hook members, or any multiple thereof. In its stead, there is provided a feed member, indicated generally by the numeral 230 which operates to control lateral displacement of the hook members one at a time during each cycle of the operation of the machine, thereby to control the feeding relation of the hooks.

The feed member 230, FIG. 5, comprises an elongate arm 232 having a rearward end portion 234, FIG. 30, secured, as by means of a setscrew 236, to a flange 238 extending laterally from a plate 240. The plate 240 is secured by the bolt 202 to the slide plate 184 to form a part of the feed section. The forward end portion of the feed arm 232 is formed with a head section 242, FIGS. 8 and 9, dimensioned to have a width corresponding to the width of the body portion of a hook member and a bottom wall 244 which is substantially flush with the portion of the plate 220 extending inwardly in a substantially horizontal direction. Integral with the head section 242 and extending downwardly from the bottom wall for a distance substantially to engage the upper wall of the strip 224 is an actuating section 246 in the form of an abutment or shoulder 248 which extends from the forward end portion of the head at the entrance side of the hook member crosswise to a rearward end portion of the head to provide a cam section which, responsive to forward displacement, engages the lateral edge of the body portion of a hook member to cam the member crosswise in the direction toward the ram head.

Responsive to movement of the slide plate 184 from normal to retracted position, the feed head 230 is displaced from its forward to rearward position in which the abutment 248 is out of the path of the hook members in the magazine to enable the adjacent hook member to be displaced gravitationally from the magazine at least partially into the path of the cam section or abutment 248. As the feed slide 184 is returned from retracted to normal position, the feed head is placed forwardly and the cam edge engages the lateral edge portions of the hook member in the path thereof to cause lateral displacement of the hook member into the intervening space between the feed slide and the ram head.

A channel section 250 (FIGURE 5) having a body portion dimensioned to overlie the top wall of the feed head 242 is formed with side walls 252 and 254 depending downwardly alongside the side walls of the feed head. The side wall 254 adjacent the ram section is cut away flush with the bottom wall 244 of the feed head to enable passage of the body portion of the hook members crosswise of the feed head responsive to displacement by the cam edge. Forwardly thereof, the side wall 254 is formed with a portion which depends downwardly to the strip 224 to provide a stop 256 which, when the feed section is in retracted position, lies in the path of the hook members in the magazine to prevent passage of the oncoming hook members beyond the feed section and into engagement with the hook member previously displaced into position to be fed into the ram head. The channel section 250 is pivotally mounted on the head section 242, as by means of a pivot pin 258 extending laterally through aligned openings in the rearward end portion of the head 246 and the side walls 254 and 252. The channel section is constantly urged downwardly onto the feed head as by means of a coil spring 260 disposed about a post 262 which extends through an opening in the top wall of the channel section 250 into threaded engagement with a threaded aligned opening in the top wall of the feed head. The spring 260 has one end which bears against the top wall of the channel section while the other end bears against a disc 264 which abuts against the head of the setscrew. Pivotal movement of the channel section is intended to facilitate the removal or displacement of hook members when desired for clearance of obstructions or the like.

The ram 166 is provided on its lower end portion with a ram head 270, FIG. 6, which, when the ram is in raised or retracted position, is in lateral alignment with the inner end portion of the hook feed magazine. The ram head comprises a rectangular block 272 having a slot 274 extending crosswise thereof and extending rearwardly from the front wall at the lower end portion of the block in alignment with the slot defined by the magazine and in which the tongue of the hook member is received. The slot 274 extends rearwardly at an upward tilt corresponding to the tilt of the tongue from a horizontally disposed body portion of the hook members to receive the tongue therein upon displacement from the magazine by the hook member displaced laterally in feeding relation by the feed section. The hook member is carried by the tongue in the block, and to prevent inadvertent forward displacement there is provided a shutter in the form of an elongate plate 276 mounted to extend downwardly adjacent the front wall of the block and dimensioned to extend downwardly beyond the slot in the block to block the slotted opening when in normal position. The plate 276 is hinged for rocking movement about a horizontal axis in a direction toward and away from the front wall of the block by means of ears 278 extending rearwardly from the upper end portion of the plate alongside the opposite side walls of the block and to which they are secured by pivot pins 280. Also fixed to the lower end portion of the plate is a flange 282 which extends rearwardly from the edge portion opposite the inlet end for the hook members to block the far end of the slot and thereby properly to align the hook members in the block and prevent lateral displacement therefrom. The plate is urged resiliently to rock in the direction toward the front wall of the block as by means of a coil spring 284 having one end bearing against the outer wall of the plate while the other end bears against the head 286 of a bolt 288 which extends through an opening 290 in the plate and into threaded engagement with an aligned opening in the front wall of the block.

Before going into a detailed discussion of the mechanism by which interengagement is effected between the hook members and the stay plates with the textile material in between, it will be expedient to define a new and novel concept which may be employed in combination with or separate and apart from the machine for feeding the hook members in the desired relation to a magazine for loading the magazine with a supply of hook members during the operation thereof. It will be understood that a device of the type described may have other applications for operation to align hook members in feeding relation for supply to a magazine or the like.

Referring now to the feed section shown in FIGS. 1–4 and 18–26 of the drawings, a cylindrical housing 300 open at the top and bottom is mounted in fixed relation on the upper portion of the frame plates. As plastic disc member 302 dimensioned to correspond with the cross-section of the cylindrical housing is removably secured over the upper end of the housing for use as a cover to enclose the housing. Instead of making use of a plastic plate, use can be made of any other rigid material, but a plastic member is preferred for visual access to the interior of the housing. A knob 304 is provided as a handle on the cover plate to facilitate movement about. Various means well known to the art might be employed for releasably securing the cover to the upper end of the housing as a closure.

The bottom wall of the housing is preferably formed of a conically shaped disc member 306 dimensioned to be received within the lower end portion of the housing. The bottom wall is formed with a central hub section 308 having an opening 310 extending therethrough for receiving a shaft 312 that operates as a spindle about which the hub is adapted to turn. The hub and the wheel-shaped bottom wall are held on the spindle by means of a flanged setscrew 314 which is threadably received in the end portion of the shaft. The lower end portion of the hub 308 is provided with a pulley 316 that is operatively connected by a belt 318 to another pulley 320 mounted on the end of shaft 322. The shaft 322 is in turn connected to the driving motor through a bevel gear 324 on the lower end of the shaft and which is in operative engagement with a driving gear 326 forming a part of a gear wheel 328. The gear teeth of the gear wheel mesh with a gear member of the drive mechanism, thereby to cause the bottom wall of the housing to turn in response to operation of the machine.

The bottom wall 306 is mounted for turning movement about an axis which is inclined in the direction towards the feed chute or magazine to bring the distant section of the bottom wall at a higher level than the near side adjacent the magazine, and the housing as well as the cover plates are mounted at the same angle. Stationarily fixed within the housing is a runway 330 which is inclined upwardly slightly from the starting end adjacent the bottom wall of the housing at the far side and terminates adjacent the top wall of the housing at the near side with the runway extending curvilinearly about the housing adjacent the inner wall from the far side to the near side in the direction of turning movement. For a substantial distance from the start 332, the runway comprises a horizontally disposed ramp 334 which rises gradually from the curvilinear end portion 332 at the start and terminates at a horizontally disposed platform 336 intermediate the ends of the runway. The ramp is dimensioned to have a width sufficient to enable the body portions to rest thereon for support of the hook members during travel up the ramp.

The platform 336, forming the upper end portion of the ramp, is provided with a reject pin 338 extending upwardly from the top wall and spaced inwardly from the edge of the ramp by an amount greater than the width of the body portion but less than the length of the tongue of the hook member. As a result, when the hook member rides up the ramp with the body portion at rest on the ramp, the hook member will be able to clear the pin without displacement so as to continue onwardly on the runway. However, when the hook member rides up the ramp with the tongue at rest on the ramp, as illustrated in FIGS. 22, 23, and 24, the hook member will be displaced inwardly by the pin as the hook member passes by the pin up the ramp, thereby to cause the hook member to be rejected and fall off the ramp.

The portion of the runway beyond the platform comprises a rail member 340, such as a wire or rod preferably dimensioned to correspond to the spaced relation between the tongue and the body portion of the hook member to enable the hook members that clear the ramp to turn in response to gravitational force and be suspended by the curvilinear portion between the tongue and body portion on the rail, as illustrated by the accepted hook members in FIGS. 23 and 25 of the drawings. The hook members now suspended from the rail are capable of continued displacement up the runway through the opening 342 provided in the side wall of the housing onto the strip 224 forming a part of the magazine housing, as illustrated in FIGS. 26 and 27. Thus, the hook members are advanced in their proper position for feeding into the magazine.

In operation, the bottom wall 306 is rotated rapidly in the direction indicated by the arrows in FIG. 18 of the drawings. Hook members located within the housing are caused to swing with the bottom wall and they are carried by centrifugal force outwardly toward the periphery of the housing. During such rotational movement in the peripheral portion of the housing, some of the hook members will naturally be deposited with the open end between the tongue and body portion extending towards the lower end portion 332 of the runway so as to be stopped on the runway for passage upwardly thereon. As additional hook members become seated on the runway, the force reactions existing will cause the elements previously deposited thereon to be advanced linearly upwardly along the runway over the ramp portion. It will be obvious that some of the hook members will come to rest on the ramp with either the body portion uppermost and at rest on the ramp or else with the tongue portion uppermost and at rest on the ramp. As additional hook members come to rest on the ramp, the ones previously deposited are displaced up the ramp. As the hook members pass the reject post 338, those being held onto the ramp by the tongue portion are cammed inwardly for displacement from the ramp. Others having the body portion uppermost are capable of passing beyond the reject post without displacement so that they continue up the runway onto the rail.

As the hook members clear the ramp and ride onto the rail which continues from the inner edge of the ramp, the portions of the hook members beyond the rail cause the hook members to rock from a horizontal position to a vertical position, thereby to hang from the rail with the tongue on the inner side thereof and with the body portion and prongs extending outwardly thereof. Thus, the hook members continue up the rail onto the strip 224 in the desired position for advancement through the magazine to the ram head for assembly.

Referring again to the assembly machine, a pin 344 pivotally connects the upper end portion of the ram 166 to the forward end portion of the ram lever 120 to enable rocking movement of the ram about a horizontal axis between its rearward or hook-receiving position to its forward or operating position to locate the hook member in position for locating the hook member in vertical alignment with the stay plate on the anvil for insertion of the prongs of the hook member through the textile material and aligned openings of the stay plate for attachment. The ram is guided in rocking movement by a lever 346 which is pivoted at its inner end on a pin 348 fixed to a bracket 350 extending forwardly from the front wall of the front frame plate 84a. The other or forward end of the lever is pivoted with a pin 352 which is received within a block 354 that is mounted for vertical sliding movement in an elongate slot 356 vertically disposed through an intermediate portion of the ram 166. The block is resiliently urged in the direction towards the lower end of the slot by means of a coil spring 358 having one end bearing against an upper portion of the ram while the lower end bears against the block.

The connecting lever 346 operates to rock the ram inwardly about its pivot responsive to movement of the ram to its raised position and to rock the ram outwardly about its pivot to operative position in vertical alignment with the stay plate during downward movement of the ram. The lever 346 operatively interconnecting the ram with the housing is usually sufficient by itself to effect the desired displacement of the ram between the hook-receiving position and the hook-attaching position, but a more positive guided relation can be established by the additional use of a guide plate which will hereinafter be described.

The additional guiding relation comprises a stud 360 (FIGURE 37) which extends laterally from an intermediate portion of the ram into operative engagement with a slot 362 extending inwardly and upwardly from the forward edge of a vertically disposed metal plate 364 rigidly secured to extend forwardly from the front wall 84a of the frame. The plate 364 is adapted to be adjusted vertically relative the front frame member properly to position the slot 362 with respect to the stud 360 for positive displacement of the ram between the retracted position in alignment with the holder and the operative position in vertical alignment with the anvil for continued downward displacement to effect the desired attaching operations. Vertical adjustment of the plate 364 can be effected by means of a setscrew 366 which extends through a vertically disposed slot 368 in the plate 364 into threaded engagement with a bracket plate 370 fixed to the front wall of the frame. Sliding engagement between the stud 360 within the slot 362 operates to guide the ram in rocking movement responsive to vertical displacement of the ram between raised and lowered positions, thereby to effect controlled displacement of the ram inwardly into proper alignment with the magazine, when the ram is in raised position, and to rock the ram outwardly into proper alignment with the anvil, when the ram is lowered to operative position.

The machine is also provided with a guide 380 (FIGURES 34 and 35) for use in properly positioning the garment or other textile material on the anvil for receiving the hook member and stay plate on opposite sides thereof for attachment to the garment and for protecting the operator against inadvertent injury by elements of the machine during the operation thereof. For this purpose, use is made of a guide and protective structure including a bracket 382 in the form of a metal block which extends in upright position to the side of the ram 166 in the direction opposite the feed slots. The block 382 is fixed at its forward edge to the front wall of the frame in vertically spaced relation with the base and it is provided at its forward end portion with a slot of rectangular or other polygonal shape, other than round. An elongate shaft 384, dimensioned in cross-section to correspond with the slot, is slidably received in fitting relation therein in a manner to permit free vertical movement of the shaft between a raised and a lowered position.

The end of the groove in which the shaft is slidable is concealed by a cover plate 386 secured, as by set-screws, to the front wall of the block to define a bore in which the shaft is slidable. A portion of the shaft extends upwardly beyond the block and is provided with a head 388 at its upper end for engagement by the upper end of a coil spring 390 mounted about the shaft. The lower end of the coil spring bears against the top wall of the block 382, thereby constantly to urge the shaft towards its raised position. It will be understood that other means conventional in the art may be employed resiliently to urge the shaft towards its raised position with sufficient force to return the shaft to its normal position when released.

A bracket 392 is secured to the lower end portion of the shaft 384 for vertical movement therewith. The bracket is formed with a horizontally disposed shelf 394 and a vertically disposed wall 396 attached to the lower end of the shaft, as by means of set screws. The wall 396 is in position to engage the under side of the block 382, when in raised position, thereby to stop upward displacement of the shaft. For cushioning impact between the bracket 392 and the block 382, during relative movement between raised and lowered positions, a cushioning means such as a rubber disc 398 is provided about the shaft immediately below the block 382.

A guide plate 400, FIGS. 5 and 35, is supported by the shelf 394 in a manner which permits both forward and rearward and crosswise adjustment properly to position the guide plate for use. For this purpose, use is made of an intermediate slide plate 402 having an opening in alignment with an elongate slot 404 in the shelf which extends in the forward and rearward direction. The opening in the slide plate is also aligned with a slot 406 that extends in the crosswise direction in a portion 408 of the guide plate. The elements are held onto the bottom side of the shelf by means of a bolt 410 and nut wherein the bolt extends downwardly through the shelf slot 404, the aligned opening of the slide plate 402, and the crosswise opening 406 of the guide plate into threaded engagement with a nut on the under side of the guide plate.

The nut member comprises an elongate element having a width slightly greater than the width of the crosswise slot 406 in the guide plate, but less than a recess formed in the under side thereof to receive the nut member therein in sliding and in seating relation. The head 412 of the bolt is preferably formed with a knurled periphery to enable a gripping relationship to be established, either by hand or by a tool, for turning the bolt in one direction or another to loosen or to tighten the bolt onto the shelf. The head 412 is of sufficient cross-section to engage the top wall of the shelf adjacent the slot openings when tightened down on the shelf to hold the parts together in their adjusted relation.

To prevent relative movement between the shelf and the slide plate other than in the linear, forward or crosswise directions, a groove 414 is formed in the top side of the slide plate and a corresponding tongue 416 depends from the bottom side of the shelf into fitting relation with the groove for guiding the interconnected elements in relative movement in the forward or rearward direction. Similarly, an elongate tongue 418 is provided in the top side to extend crosswise in the slide plate, and a groove 420 extending in the same direction is formed in the bottom side of the slide plate to limit relative movement between the guide plate and the slide plate to the crosswise direction.

The slide plate is formed with a forwardly extending rule 422 and a rule 424 extending laterally from the forward end portion thereof. These elements operate between themselves to provide a type of square about the anvil which can be employed properly to align the textile material in position and to hold down the textile material on the anvil. The inner edge portion of the forwardly extending rule 422 is formed with a recess 426 substantially aligned crosswise with the center of the anvil so as to enable exact location of the crosswise line from the stay plates for determining the position of attachment. The inner edges of the rules are tapered downwardly to a rather blunt edge and the under sides of the rules are formed relatively flat for fuller engagement with the textile material when the guide plate is displaced downwardly onto the textile material in its lowered position.

To protect the operator, a guard is provided in the form of laterally spaced-apart upwardly extended walls 428 and 430 which extend contiguously from the lateral edges of an upwardly inclined front wall 432. The guard members are secured to the guide plate by means of a cross brace member 434 having a pair of crosswise slots 436 through which setscrews 438 extend to secure the crosswise brace members onto the crosswise extending rule 424 of the guide section.

The machine is set into operation by means of an operating lever 440 (FIGURES 1, 3, 33 and 34) which is pivoted intermediate its ends on a post 442 extending forwardly from the upper portion of the front frame 84a. The upper end 444 of the operating lever is provided with a block 446 in position to engage a button on a switch 450 when the lever arm is rocked about its pivot from normal to operated position. To prevent rocking movement of the lever 440 in the direction to make the switch 450 until the guard and guide plate sections are in their lowered position, the shelf 394 is provided with a portion 452 that extends rearwardly into the path of the lower end portion 440 of the operating lever. Thus the lever arm cannot be rocked by an amount to make the switch until the shelf is lowered to the extent that the lower end portion of the lever arm is able to clear the shelf. The switch 450 may be of the operating type for immediate return of the button 448 and the lever 440 to normal position.

*Operation*

At the start of a cycle of operation of the machine, the slide plate 184 is in its forward or normal position, with the portion 190 of the ejector arm 188 underlying the lowermost of the stay plates 176 in the magazine 170 and with the feed head 242 located in its normal forward position within the space available in the magazine between the displaced hook member in position to be advanced into the ram head and the lowermost hook member in the magazine.

The ram 166 is in its rearward position with the ram head 270 in crosswise alignment with the end of the magazine. A stay plate is located in the slot extending crosswise on the anvil in which the rocker arms for folding the prongs are in their lower position.

The guide plate 380 is in its upper or raised position with the extension 452 in the path of the starting lever 440 to block displacement thereof sufficiently to prevent switch 450 from being made.

The portion of the fly 30 of a man's trousers is positioned on the base plate over the anvil with the upper edge portion of the zipper 32 showing through the guide slot 426 in the forwardly extending rule 422. The seams of the trousers can be aligned with the forwardly extending rule 422 and the crosswise extending rule 424 properly to align the zipper and properly to locate the stay plate on the under side of the trousers. When properly positioned on the base plate, the trouser portion can be held by one hand while the other hand can be used to bring the guide plate 380 downwardly onto the top of the trousers and the base plate, thereby to clamp the trouser portion in position of use between the bottom side of the guide plate and the top side of the base plate over the anvil.

As the guide plate is brought down to its lowered position, the extension 452 passes beyond the lower edge of the operating lever 440 so that the lever 440 can clear the obstruction and be rocked about its pivot sufficiently to make the switch 450.

In the meantime, the driving motor 90 has been continuously run. When the starter switch 450 is made, a brake is released to enable the shaft 111 to be operated by the driving shaft 106 from the motor. In sequence, the following operations take place.

The follower 128 on the end of ram lever 120 rides up on the edge of the cam 114. This causes the ram lever to rock in the clockwise direction about its pivot 124. As the ram lever 120 is rocked about its pivot, the ram 166, pivoted to the forward end of the lever at 344, is displaced in the downward direction. As the ram 166 is displaced downwardly, the pin 360 operative in the guide slot 362 and the link 346 function in combination to cause the ram to be rocked forwardly about its pivot in the counter-clockwise direction until the ram head 270 is displaced forwardly from a position in crosswise alignment with the magazine to a position substantially in vertical alignment with the anvil 460 of the anvil mechanism 168. As the follower 128 continues to ride outwardly on the cam 114, the ram 166 is displaced further downwardly to bring the ram head 270 into engagement with the underlying portion of the textile material and the anvil 460 therebeneath.

As the ram head 270 is displaced downwardly into resilient engagement with the underlying textile material and anvil, the prongs 54, 56, and 58 of the hook member carried by the anvil are forced downwardly through the textile material and through the aligned openings 64, 66, and 68 in the stay plate provided in the groove on the anvil underlying the textile material. The extent of movement of the ram 166 is adjusted as by means of the setscrew 462 to effect a firm resilient engagement between the stay plate and the body portion of the hook member with the textile material in between.

The full extent of downward movement of the ram is achieved as the follower 128 turns from the side wall onto the flattened outer end portion of the cam member 114, thereby to hold the ram in its operative position for a time sufficient to effect the desired bending operations in response to action of the cam 116.

As the follower 128 travels over the flattened end portion of the cam 114, cam 116 is rotated to a position where the follower 144 on the anvil lever 134 comes into engagement with the hump provided thereon. This causes the follower to be displaced briefly outwardly, thereby to rock the anvil lever 134 in the counter-clockwise direction about its pivot 138. This raises the forward end portion 464 of the anvil lever to actuate an operating member 466 of the anvil mechanism to cause swinging movement of the rocker arms pivotally mounted in the slotted portions of the anvil for bending the prongs of the eye members which extend downwardly through the stay plates. For the function and operation of the anvil mechanism, reference may be made to the patent of Brayton, No. 2,697,221, issued in 1954, and entitled "Fastener Setting Attachment." Detailed description of the mechanism and operation need not be given herein since the aforementioned patent provides adequate disclosure of the elements and the operation thereof. In brief, the rocker arms comprise levers pivoted to the anvil housing within slots for rocking movement simultaneously in the directions for bending the prong members forwardly into the adjacent recesses provided on the under side of the stay plate. The upper edge portions of the rocker arms are contoured progressively to engage the prongs extending downwardly through the openings of the stay plates to bend the prongs upwardly substantially perpendicularly and thereby lay the prongs smoothly and flatly within the recesses provided therefor on the under side of the stay plates. During the bending operation, the hook member is held by the ram in the desired relationship to the stay plates so that the attachment and interconnection can be effected under fully controlled conditions for the standpoint of proper alignment and spacing one from the other.

The hammer 470 for actuating the anvil mechanism to effect operation of the rocker arms may be adjusted endwise in the end portion of the lever arm 134 to adjust the point of impact and the duration of impact. For this purpose, the hammer 470 is formed with a threaded shank 472 which threadably engages a threaded opening in the end of the lever arm 134. Means, such as a slot, is provided in the under side of the hammer to enable turning movement to effect endwise adjustment thereof relative the lever arm. Thus the hammer 470 can be shifted upwardly or downwardly to vary the time and extent of displacement of the anvil mechanism.

By the time that the rocker arms have completed their bending action, the follower 144 has passed over the outwardly extending portion of the cam 116 and almost coincidental therewith the follower 128 turns from the flattened outer end portion of the cam 114 onto the side edges thereof so that the anvil lever and the cam lever are free for return movement. The anvil lever 134 is returned in response to the return of the rocker arms and in response to gravitational force while spring 130 becomes effective to cause the follower 128 resiliently to ride on the edge of the cam 114, thereby to control the ram in its return movement. As the ram 166 is raised, the pin 360 enters the guide slot 362 and the link 346 becomes effective to cause the ram to rock rearwardly about its pivot until it is stopped in crosswise alignment with the end of the magazine with the slot 274 in the ram head 270 in alignment with the guide slot in the magazine for receiving the tongue 52 of the hook member outermost in the magazine upon displacement by the oncoming hook member actuated sidewise through the magazine by the feed head 242.

During return movement of the anvil lever 134 and the cam lever 120 or starting immediately prior thereto, the roller 152 on the feed lever 146 begins to ride outwardly on the edge of the cam member 118 in a manner to cause the feed lever 114 to rock in the crosswise direction about its pivot 148. Rocking movement causes the lower end portion 158 of the feed lever to be displaced rearwardly with the result that the slide section 184 connected by the link 178 is displaced rearwardly therewith.

As the slide section is displaced from its forward to its rearward position, the ejector arm 190 is displaced rearwardly from its normal to its retracted position. In this position, the offset 194 clears the opening in the lower end portion of the magazine 170 so that the lowermost stay plate 176 in the stack is able to drop downwardly onto the step-down portion 192 of the feed lever into the path of the shoulder in the ejector arm.

Simultaneously with the displacement of the feed arm 190 from its forward to its retracted position, the hook member feed head 242 is displaced from its described forward position to its rearward position. While in this position, the portion 256 on the underside of the feed arm is retracted from the slot in the magazine out of the path of the aligned hook members so that the hook members can be displaced gravitationally lengthwise through the magazine to bring the innermost hook member adjacent the feed head in the magazine into the area of the magazine formerly occupied by the feed head, when in its forward or normal position. The offset 256 of the feed head blocks the path of the hook member so as to prevent passage of the hook members beyond the area formerly occupied by the feed head and into engagement with the previously displaced hook member in position to be fed into the ram head. Thus both a stay plate and a hook member are in position to be displaced in feeding relation toward the anvil and toward the ram head, respectively.

As the follower 152 continues to ride over the periphery of the cam 118 to the retrenchment side of the cam, the feed lever 146 is free to rock in the counter-clockwise direction to permit forward displacement of the end portion 158 and the feed slide 184 operatively connected thereto. Forward displacement in feeding relation is achieved in response to the resilient force available from the spring 154 resiliently connecting a portion of the feed lever below its pivot 148 to the back side of the front frame wall of the device. Thus it will be apparent that in the event that any obstructions are encountered or in the event that any element is jammed so as not to be able to be advanced in feeding relation either to the ram head or to the anvil, the feed slide 184 is capable of sufficient give to prevent jamming the machine by forcing the elements toward their normal or operative position. In the event that an occurrence exists whereby the feed slide is incapable of full return to its normal forward position, the member 204 will not return to operate the switch button 206 with the result that further operation of the machine will be stopped. Operation of the machine will be prevented until such time as the obstruction is located and removed sufficient to permit the feed slide to return to normal position. It is for this purpose that shutter means such as the rocker plate 276 and the channel member 250 are provided on the feed head and ram head for gaining access to effect removal of elements located therein to eliminate jamming which might have occurred to block normal operation of the machine.

Assuming that no obstructions have been encountered and the feed slide is capable of return to normal position, as the slide is displaced forwardly, the ejector arm 190 is displaced forwardly. As the ejector arm is displaced forwardly through the feed slot for the stay plates, the abutment 194 rearwardly of the lowermost stay plate 190 resting on the stepdown portion 192 engages the lowermost stay plate in the magazine to effect displacement thereof forwardly into the feed slot. As the stay plate is displaced forwardly, it causes simultaneous displacement of the stay plates in endwise alignment therewith so as to move the outermost stay plate in the feed slot into proper position on the anvil 460.

Simultaneously, the feed arm 242 is displaced forwardly from its retracted to its normal position of adjustment. During such forward displacement, the abutment 256 advances out of the path of the slot in the feed mechanism so as to clear the path for displacement of the stay plate occupying the space of the feed arm when in its normal position. As the feed arm shifts forwardly, the edge portion of the cam 248 engages the outer side wall of the tongue disposed within the magazine slot to cause sidewise displacement of the tongue and the remainder of the hook members suspended therefrom through the slot in the feed magazine. Lateral displacement of the hook member by the feed arm advances the hook member into endwise engagement with the previously displaced hook member in the end of the magazine so that the latter will be displaced positively for a distance equal to the width of the hook member for entrance into the slot 274 of the ram head. As the cam section 246 returns from retracted to normal position, it immediately blocks the feed slot of the magazine so as to prevent lateral displacement of the remainder of the hook members in the magazine as the one hook member in the path therewith is advanced laterally towards the ram head. Thus positive displacement is effective for feeding both the stay plate and a hook member to the elements pre-positioned for use in a next cycle of operation.

Simultaneously with the operation of the driving shaft, a brake for the bottom wall 306 of the feed table is released so as to effect rotational movement of the bottom wall 306 about its axis while the machine is traveling through a normal cycle of operation. Thus hook members are caused to ride up the ramp, as previously described, to supply the magazine with additional hook members in amounts to maintain a full supply for use.

As the cam shaft completes its cycle of operation, the outer end portion of the cam 114 is adapted to engage the switch arm 162 of the switch 164 which functions to close the brakes and disconnect the cam shaft from the drive shaft so as to discontinue further operation of the elements while the motor continues to operate in preparation for subsequent cycles of operation.

It will be understood that the foregoing merely provides a brief description of the various elements and parts, their arrangement and operation, and it will be further understood that various changes may be made with respect to the substitution of equivalents and in the arrangement of parts, without departing from the spirit of the invention, especially as defined in the following claims.

I claim:

1. In a machine for the assembly of a hook member having a body portion with prongs extending substantially perpendicularly therefrom and a tongue extending angularly adjacent the opposite side of the body portion and a stay plate having openings through which the prongs of the hook member extend for attachment with a textile material therebetween, the improvement comprising means for feeding the hook members in a desired relation into a feed magazine comprising a stationary housing, a flat bottom wall in the housing mounted for rotational movement, a power source, an operative connection between said power source and the bottom wall for rotational movement of the bottom wall, a shelf extending circumferentially within the housing and rising gradually from the bottom wall toward the top in the direction of turning movement to the bottom wall, said shelf having a width greater than the length of the body portion of the hook member to enable the body portion to ride up on the shelf with the hook suspended therefrom beneath the shelf and with the prongs extending upwardly therefrom, and means in an intermediate portion of the shelf in position to engage hook members riding up the shelf other than with the body portion resting on the shelf to displace such hook members from the shelf.

2. The improvement as claimed in claim 1 which includes a rail as a continuous extension from the forward upper edge of the shelf onto which the hook members are displaced from the shelf for travel up the rail in end to end relation with the body portion suspended vertically from one side and the tongue suspended from the other side of the rail.

3. In a machine for the assembly of a hook member having a body portion with prongs extending substantially perpendicularly therefrom and a tongue extending angularly adjacent the opposite side of the body portion and a stay plate having openings through which the prongs of the hook member extend for attachment with a textile material therebetween, the improvement comprising means for feeding the hook members in a desired relation into a feed magazine comprising a housing, a bottom wall in the housing mounted for rotational movement, a shelf extending circumferentially from within the housing and rising gradually from the bottom wall towards the top in the direction of turning movement of the bottom wall, said shelf having a width greater than the length of the body portion of the hook member to enable the body portion to ride up on the shelf with the hook member suspended therefrom beneath the shelf and with the prongs extending upwardly therefrom, the tongue of the hook member being dimensioned to have a length greater than the body portion, and means for displacing improperly positioned hook members from the shelf comprising an abutment spaced from the edge of the shelf by an amount greater than the length of the body portion but less than the length of the tongue to displace the hook members from the shelf when the tongue is resting on the shelf as distinguished from the body portion.

References Cited in the file of this patent

UNITED STATES PATENTS

| | | |
|---|---|---|
| 659,746 | Hargraves | Oct. 16, 1900 |
| 2,327,401 | Chilton | Aug. 24, 1943 |
| 2,872,019 | Owen | Feb. 3, 1959 |
| 2,888,169 | Hausman et al. | May 26, 1959 |